United States Patent
Sethi et al.

(10) Patent No.: US 11,677,171 B2
(45) Date of Patent: Jun. 13, 2023

(54) SYSTEM AND METHOD FOR SEALING ELECTRICAL TERMINALS

(71) Applicant: TE Connectivity Services GmbH, Schaffhausen (CH)

(72) Inventors: Sunny Sethi, Castro Valley, CA (US); Vijay Daga, Sunnyvale, CA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 26 days.

(21) Appl. No.: 16/842,934

(22) Filed: Apr. 8, 2020

(65) Prior Publication Data

US 2021/0320440 A1      Oct. 14, 2021

(51) Int. Cl.
| | |
|---|---|
| *H01R 4/72* | (2006.01) |
| *B29C 65/48* | (2006.01) |
| *H01R 43/00* | (2006.01) |
| *H02G 15/04* | (2006.01) |

(52) U.S. Cl.
CPC ........... *H01R 4/72* (2013.01); *B29C 65/4815* (2013.01); *H01R 43/00* (2013.01); *H02G 15/04* (2013.01)

(58) Field of Classification Search
CPC .................................. H01R 4/22; H01R 4/72
USPC ................................................... 174/DIG. 8
See application file for complete search history.

(56) References Cited

U.S. PATENT DOCUMENTS

| | | | | |
|---|---|---|---|---|
| 4,440,821 A | * | 4/1984 | Komura | H02G 15/1806 428/347 |
| 4,728,550 A | * | 3/1988 | Van Beersel | B29C 61/0616 428/347 |
| 4,940,179 A | * | 7/1990 | Soni | H01R 4/723 228/56.3 |
| 6,451,050 B1 | * | 9/2002 | Rudakov | A61L 31/06 623/1.42 |
| 6,737,586 B2 | * | 5/2004 | Inagaki | H05K 3/281 174/117 FF |
| 2018/0323519 A1 | | 11/2018 | Sethi et al. | |
| 2020/0035383 A1 | | 1/2020 | Cook | |

OTHER PUBLICATIONS

PCT Written Opinion of the International Searching Authority, dated Jul. 1, 2021, 8 pgs.
PCT International Search Report, dated Jul. 1, 2021, 3 pgs.

* cited by examiner

*Primary Examiner* — Chau N Nguyen

(57) ABSTRACT

A sealing device and method for sealing an electrical terminal. The sealing device includes a heat shrinkable tubing having an inner wall. A first sealant/adhesive is configured to cooperate with the heat shrinkable tubing. The first sealant/adhesive has a first sealant/adhesive first surface and an oppositely facing first sealant/adhesive second surface. The second surface of the first sealant/adhesive is bonded to the inner wall of the heat shrinkable tubing. A second sealant/adhesive is configured to cooperate with free ends of electrical conductors which are in electrical engagement with the electrical terminal. The second sealant/adhesive has a second sealant/adhesive first surface and an oppositely facing second sealant/adhesive second surface. The second sealant/adhesive first surface is provided in engagement with the electrical conductors. The second sealant/adhesive second surface is provided in engagement and bonded with the first sealant/adhesive first surface.

13 Claims, 3 Drawing Sheets

SYSTEM AND METHOD FOR SEALING ELECTRICAL TERMINALS

FIELD OF THE INVENTION

The invention is directed to a sealing device and method to seal the electrical and mechanical termination between electrical conductors and an electrical terminal. In particular, the invention is directed to a sealing device and method in which sealants/adhesives of different viscosity can be applied to the terminal area to provide for a proper seal.

BACKGROUND OF THE INVENTION

Ring terminals are typically used to attach electrical wires to studs or posts (such as those found on vehicle batteries and other batteries) and are manufactured in various types and sizes. Ring terminals typically include a ring portion and a wire attachment/connection portion to which electrical wires are connected by welding or other means. Non-insulated ring terminals can be crimped or soldered and may be finished off with heat shrink tubing to insulate and protect the connection formed between the electrical wires and the wire attachment portion of the terminal. Heat shrink tubing (HST) is a shrinkable plastic tube often used to insulate electrical wires. HST provides abrasion resistance and environmental sealing protection for stranded and solid wire conductors, connections, joints, and terminals used in various electrical applications. HST can also be used to repair damaged insulation on electrical wires, bundle wires together, and to create cable entry seals. As stated above, HST may be a single-walled system or a multi-walled system, wherein the multi-walled system includes at least one heat-shrinkable layer and at least one layer of a sealant system. Heat shrink tubing is commonly manufactured from fluoropolymer or polyolefin, which shrinks radially when heated. The process of shrinking an HST is referred to as "recovering" an HST and the predetermined temperature at which an HST starts to recover is referred to as its "recovery temperature". As an HST recovers, i.e., shrinks, it exerts an inward force against the items it surrounds, which is referred to as the "hoop stress" of the HST. More specifically, hoop stress (also known as cylinder stress) is the force exerted circumferentially (perpendicular both to the axis and to the radius of the object) in both directions on every particle in the tubing or cylinder wall. The degree of hoop stress is determined by certain HST characteristics such as the type of base material, wall thickness, degree of cross-linking, and degree of expansion. Hoop stress is also affected by process parameters such as temperature of recovery and degree of recovery.

Ring terminals currently used with passenger and commercial vehicle electrical systems include single-wire and multi-wire configurations. Multi-wire configurations have created significant challenges with regard to sealing the terminal-wire interface area on such terminals. External sealant systems that include the use of heat shrink tubing and an adhesive/sealant layer have been previously used to create a watertight seal in between and outside of the electrical wires attached to the terminal. However, existing sealant systems are not capable of sealing the multiple electrical wires (e.g., six or more wires) included in multi-wire configurations in a simple and reliable manner. A first problematic situation involves the wicking of water (if present in the operating environment); water can wick from the ring portion of the terminal onto the wire attachment portion of the terminal, then onto the attached electrical wires, and then from one end of the electrical wires to the other end thereof through the welded or crimped interface; water can also wick from in between the wires and into the terminal. A second problematic issue involves the flow or oozing of excessive adhesive or sealant onto the ring portion of the ring terminal. Adhesive that is present on the ring portion can interfere with the metal to metal contact that is needed for an effective electrical contact.

To overcome the limitations of sealing systems that involve the use of external adhesive and heat shrink tubing, the industrial approach currently used involves a multi-component, multi-step process. This process is labor intensive and expensive; therefore, there is an ongoing need for a sealing system for use with ring terminals that meets all functional requirements in a simplistic, reliable, and cost-effective manner.

SUMMARY OF THE INVENTION

The following provides a summary of certain illustrative embodiments of the present invention. This summary is not an extensive overview and is not intended to identify key or critical aspects or elements of the present invention or to delineate its scope.

An embodiment is directed to a sealing device for sealing an electrical terminal. The sealing device includes a heat shrinkable tubing having an inner wall. A first sealant/adhesive is configured to cooperate with the heat shrinkable tubing. The first sealant/adhesive has a first sealant/adhesive first surface and an oppositely facing first sealant/adhesive second surface. The second surface of the first sealant/adhesive is bonded to the inner wall of the heat shrinkable tubing. The first sealant/adhesive has a first viscosity, A second sealant/adhesive is configured to cooperate with free ends of electrical conductors which are in electrical engagement with the electrical terminal. The second sealant/adhesive has a second sealant/adhesive first surface and an oppositely facing second sealant/adhesive second surface. The second sealant/adhesive first surface is provided in engagement with the electrical conductors. The second sealant/adhesive second surface is provided in engagement and bonded with the first sealant/adhesive first surface. The second sealant/adhesive has a second viscosity which has a lower viscosity than the first sealant/adhesive.

An embodiment is directed to a sealing device for use with a cover for sealing electrical conductors of an electrical terminal, the cover having an inner wall. The sealing device include a first sealant/adhesive and a second sealant/adhesive. The first sealant/adhesive is configured to cooperate with the cover. The first sealant/adhesive has a first sealant/adhesive first surface and an oppositely facing first sealant/adhesive second surface. The second surface of the first sealant/adhesive is bonded to an inner wall of the cover. The first sealant/adhesive has a first viscosity. The second sealant/adhesive is configured to cooperate with free ends of electrical conductors which are in electrical engagement with the electrical terminal. The second sealant/adhesive has a second sealant/adhesive first surface and an oppositely facing second sealant/adhesive second surface. The second sealant/adhesive first surface is provided in engagement with the electrical conductors. The second sealant/adhesive second surface is provided in engagement and bonded with the first sealant/adhesive first surface. The second sealant/adhesive has a second viscosity which has a lower viscosity than the first sealant/adhesive. Upon application of heat, the first sealant/adhesive conforms to the inner wall of the cover. Upon application of additional heat, the second sealant/ adhesive the first sealant/adhesive to melt and flow across and between the free ends of the electrical conductors to fill air voids present between the electrical conductors.

An embodiment is directed to a method of sealing electrical conductors to an electrical terminal. The method includes: manufacturing sealing device having a first sealant/adhesive and a second sealant/adhesive, the first sealant/adhesive having a first sealant/adhesive first surface and an oppositely facing first sealant/adhesive second surface, the first sealant/adhesive having a first viscosity, the second sealant/adhesive having a second sealant/adhesive first surface and an oppositely facing second sealant/adhesive second surface, the second sealant/adhesive first surface bonded to the first sealant/adhesive second surface, the second sealant/adhesive has a second viscosity which is a lower viscosity than the first viscosity of the first sealant/adhesive; and bonding the first sealant/adhesive to an inner wall of a heat shrinkable tubing.

Additional features and aspects of the present invention will become apparent to those of ordinary skill in the art upon reading and understanding the following detailed description of the illustrative embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more illustrative embodiments of the invention and, together with the general description given above and detailed description given below, serve to explain the principles of the invention, and wherein.

DETAILED DESCRIPTION OF THE INVENTION

Figure 1:
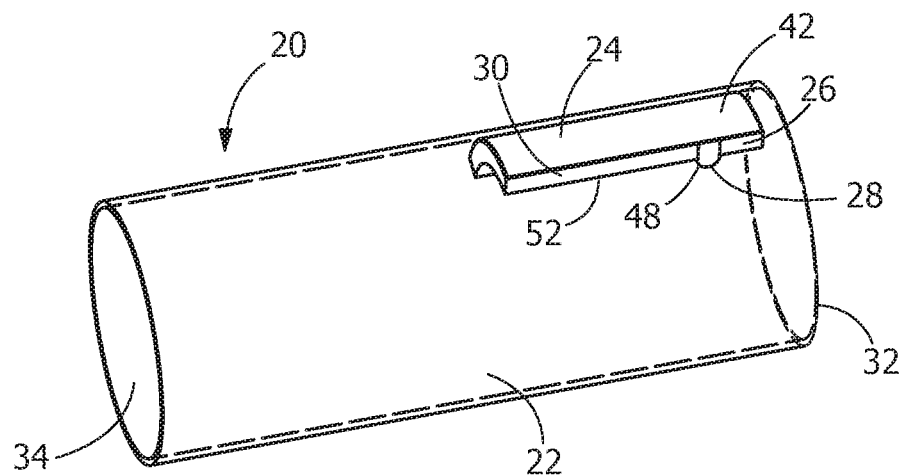
FIG. 1 is a perspective view of an illustrative sealing device for sealing an electrical terminal in accordance with the present invention, illustrating a heat shrinkable tubing with a layered sealant/adhesive provided thereon.
Figure 2:
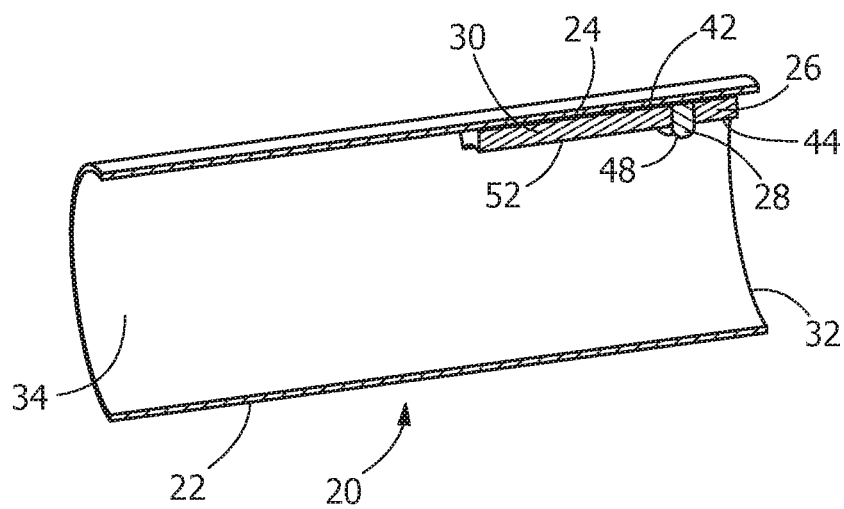
FIG. 2 is a cross-sectional perspective view of the device of FIG. 1, shown prior to recovery of the heat shrinkable tubing components thereof.
Figure 3:
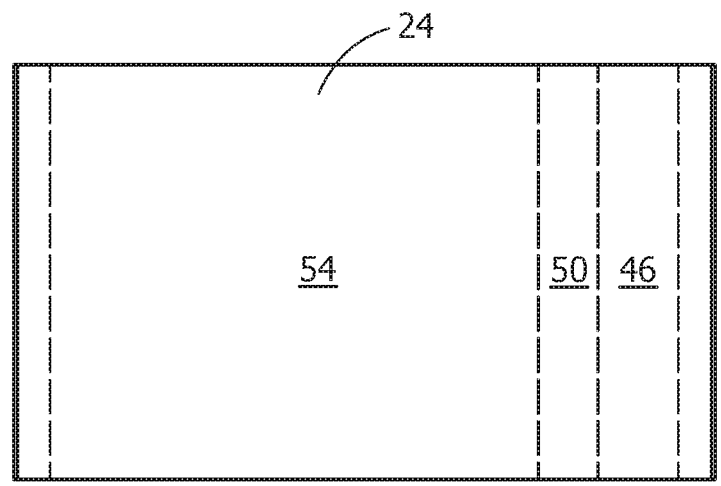
FIG. 3 is a top view of the layered sealant/adhesive of FIG. 1.
Figure 4:
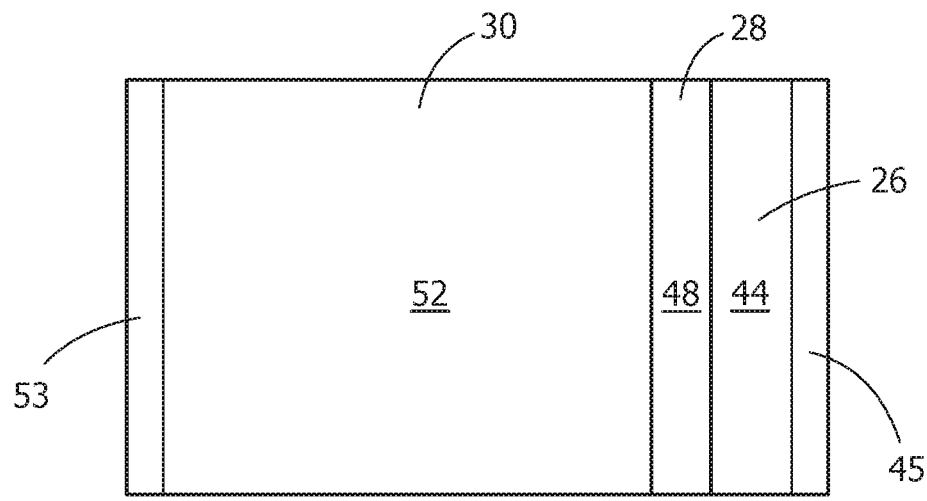
FIG. 4 is a bottom view of the layered sealant/adhesive of FIG. 1.
Figure 5:
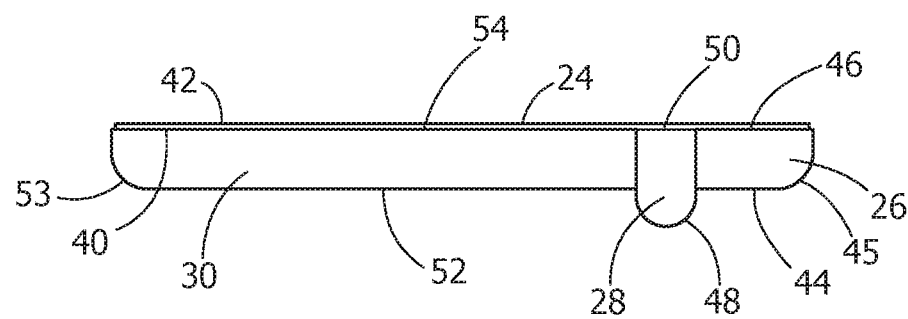
FIG. 5 is a side view of the layered sealant/adhesive of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Illustrative embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 6:
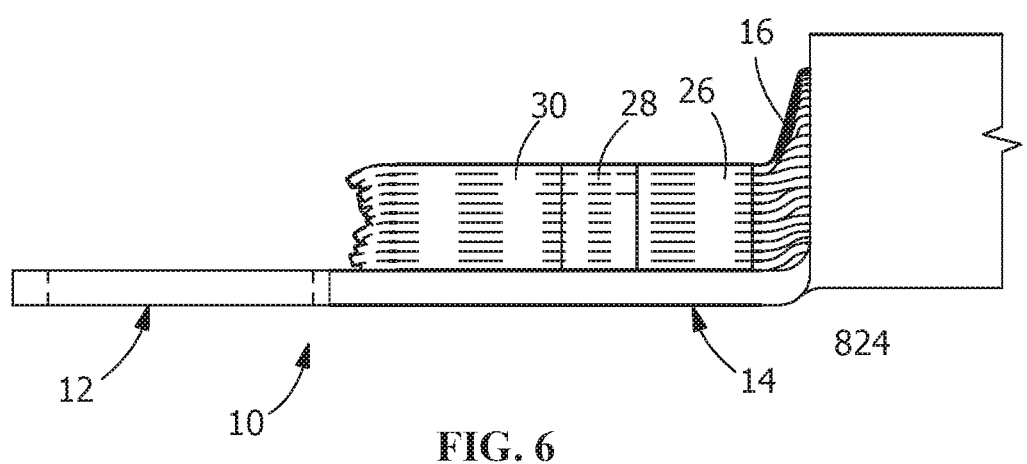
FIG. 6 is a diagrammatic side view a ring-type electrical terminal that includes a plurality of electrical wires attached to the wire attachment portion thereof, shown after the sealing device of FIG. 1 has been recovered from a heating source, illustrating the distribution of adhesive between the electrical wires.

With reference to the Figures, FIG. 6 provides an illustration of an electrical terminal 10 that is compatible with the systems, methods, and devices of the present invention. The electrical terminal shown in FIG. 6 is a ring-type terminal; however, the systems, methods, and devices of this invention are also compatible with many other types of electrical terminals such as, for example, spade terminals, hook terminals, flag terminals, push-on terminals, and the like. With reference to FIG. 6, electrical terminal 10 includes terminal attachment portion 12 and wire attachment portion 14. Terminal attachment portion 12 is configured for connection to a complementary terminal, such as a stud or a post, of an electrical device such as, for example, a battery. Wire attachment portion 14 is configured for connection to one or more electrical wires, such as plurality of wires 16, which may be connected by welding, soldering, crimping or other suitable attachment methods.

With reference to FIGS. 1 through 5, an illustrative embodiment of an electrical terminal sealing device 20 of the invention is shown. Device 20 includes a piece of shrinkable tubing 22; a first strip (e.g., a planar member, strip or other profiled geometry) of a first sealant/adhesive 24; a second strip (e.g., a planar member, strip or other profiled geometry) of a second sealant/adhesive 26; a third strip (e.g., a planar member, strip or other profiled geometry) of a third sealant/adhesive 28, and a fourth strip (e.g., a planar member, strip or other profiled geometry) of a fourth sealant/adhesive 30. The first sealant/adhesive 24, the second sealant/adhesive 26, the third sealant/adhesive 28, and the fourth sealant/adhesive 30 are positioned on the shrinkable tubing 22 prior to the shrinkable tubing 22 being positioned on the terminal 10. In various illustrative embodiments, the first sealant/adhesive 24, the second sealant/adhesive 26, the third sealant/adhesive 28 and the fourth sealant/adhesive 30 may be co-extruded.

The shrinkable tubing 22 can be a single layer or multilayer tubing. The shrinkable tubing 22 is a polymeric component that shrinks on the application of heat. Such shrinkable tubing may include, but is not limited to, heat shrinkable tubing or tape. The term sealant/adhesive includes, but is not limited to, sealants and adhesives which are viscoelastic materials that have an ability to flow under suitable stimulus like temperature and/or pressure. Examples of such materials are hot melt adhesives and butyl mastics.

The first strip of the first sealant/adhesive 24 is placed within the shrinkable tubing 22. The first sealant/adhesive 24 is a high viscosity sealant/adhesive. In one illustrative embodiment the high-viscosity sealant/adhesive has a viscosity that is greater than 20 Pa·s at an installation temperature which correlates to a designated or rated temperature. However, the viscosity of the first sealant/adhesive 24 may vary. The first sealant/adhesive 24 has a first sealant/adhesive first surface 40 and an oppositely facing first sealant/adhesive second surface 42. The first sealant/adhesive second surface 42 is bonded to an inner wall 34 of the heat shrinkable tubing 22.

The first sealant/adhesive 24 is configured to have a melting point which is below the melting point of the other sealants/adhesives 26, 28, 30. This allows the first sealant/adhesive 24 to be ultra-sonically welded to the shrinkable tubing 22 without causing the other sealants/adhesives 26, 28, 30 to prematurely melt or flow. For example. The melting temperature of the first sealant/adhesive 24 may be in the range of 105 degrees Celsius to 120 degrees Celsius while the melting temperature of the other sealants/adhesives 26, 28, 30 may be in the range of 110 degrees Celsius to 130 degrees Celsius. By providing for a lower melting point of the first sealant/adhesive 24, the first sealant/adhesive 24 can properly bond to the shrinkable tubing 22 and to the other sealants/adhesives 26, 28, 30 when the device 20 is assembled.

In the illustrative embodiment shown, the first sealant/adhesive 24 has a thickness of between 0.25 mm and 1.0 mm. The width of the first sealant/adhesive is equal or greater width than the second sealant/adhesive 26, the third sealant/adhesive 28 and/or the fourth sealant/adhesive 30. The first viscosity of the first sealant/adhesive 24 is greater than 20 Pas at an installation temperature. The first sealant/adhesive 24 is a cross-linkable sealant/adhesive.

The second strip of the second sealant/adhesive 26 is placed within the shrinkable tubing 22 adjacent to or proximate an edge 32 of the shrinkable tubing 22. The second sealant/adhesive 26 is a low viscosity sealant/adhesive. The viscosity of the second sealant/adhesive 26 is lower than the viscosity of the first sealant/adhesive 24. In one illustrative embodiment, the low-viscosity sealant/adhesive has a viscosity that is less than 20 Pa·s at an installation temperature which correlates to a designated or rated temperature, as previously described. The second sealant/adhesive 26 has a second sealant/adhesive first surface 44 and an oppositely facing second sealant/adhesive second surface 46, The second sealant/adhesive second surface 46 is provided in engagement and bonded with the first sealant/adhesive first surface 40. The second sealant/adhesive first surface 44 faces the electrical wires or conductors 16. In the illustrative embodiment shown, the second sealant/adhesive first surface 44 has a rounded portion 45 proximate an end thereof. However, the second sealant/adhesive first surface 44 may have other configurations.

The third strip of the third sealant/adhesive 28 is placed within the shrinkable tubing 22. The strip of the third sealant/adhesive 28 is spaced from the edge 32 and is adjacent to or spaced from the strip of the second sealant/adhesive 26. The spacing or distance between the strip of the second sealant/adhesive 26 and the strip of the third sealant/adhesive 28 is application dependent, depending upon, but not limited to the construction and size of the terminal. For example, the spacing or distance between the strip of the second sealant/adhesive 26 and the strip of the third sealant/adhesive 28 may range between 0 mm and 10 mm. The third sealant/adhesive 28 is a high viscosity sealant/adhesive. In one illustrative embodiment the high-viscosity sealant/adhesive 28 has a viscosity that is greater than 20 Pa·s at an installation temperature which correlates to a designated or rated temperature, as previously described. The third sealant/adhesive 28 has a third sealant/adhesive first surface 48 and an oppositely facing third sealant/adhesive second surface 50, The third sealant/adhesive second surface 50 is provided in engagement and bonded with the first sealant/adhesive first surface 40. The third sealant/adhesive first surface 48 faces the electrical wires or conductors 16. In the illustrative embodiment shown, the third sealant/adhesive first surface 48 has a rounded configuration. However, the third sealant/adhesive first surface 48 may have other configurations.

The strip of the fourth sealant/adhesive 30 is placed within the shrinkable tubing 22. The strip of the fourth sealant/adhesive 30 is spaced from the edge 32 and is adjacent to or spaced from the strip of the third sealant/adhesive 28. The spacing or distance between the strip of the fourth sealant/adhesive 30 and the strip of the third sealant/adhesive 28 is application dependent, depending upon, but not limited to the construction and size of the terminal. For example, the spacing or distance between the strip of the fourth sealant/adhesive 30 and the strip of the third sealant/adhesive 28 may range between 0 mm and 10 mm. The fourth sealant/adhesive 30 is a low viscosity sealant/adhesive. In one illustrative embodiment the low-viscosity sealant/adhesive 30 has a viscosity that is less than 20 Pa·s at an installation temperature which correlates to a designated or rated temperature, as previously described. The fourth sealant/adhesive 30 has a fourth sealant/adhesive first surface 52 and an oppositely facing fourth sealant/adhesive second surface 54. The fourth sealant/adhesive second surface 54 is provided in engagement and bonded with the first sealant/adhesive first surface 40. The fourth sealant/adhesive first surface 52 faces the electrical wires or conductors 16. In the illustrative embodiment shown, the fourth sealant/adhesive first surface 52 has a rounded portion 53 proximate an end thereof. However, the fourth sealant/adhesive first surface 52 may have other configurations.

In the embodiment shown, the strip of the fourth sealant/adhesive 30 is the same or similar to the strip of the second sealant/adhesive 26. However, the strip of the fourth sealant/adhesive 30 and the strip of the second sealant/adhesive 26 may be made of different materials and have different viscosities. In the embodiment shown, the strip of the first sealant/adhesive 24 is the same or similar to the strip of the third sealant/adhesive 28. However, the strip of the first sealant/adhesive 24 and the strip of the third sealant/adhesive 28 may be made of different materials and have different viscosities.

The strip of the third sealant/adhesive 28 has a flow behavior such that it conforms to the surface of the wire attachment portion or surface of the plurality of wires without significantly flowing out of the desired region. This is achieved by using a sealant/adhesive in the strip of the third sealant/adhesive 28 which has a high inherent viscosity, or which could attain high viscosity by methods like cross-linking (where the cross-linking induces viscosity increase at a higher rate than an ooze out rate). The strip of the third sealant/adhesive 28 creates a barrier and prevent ooze out of the fourth sealant/adhesive 30. The strip of the fourth sealant/adhesive 30 has a low initial viscosity which allows it to displace air efficiently inside the substrate intended to be sealed. The strip of the fourth sealant/adhesive 30 creates a robust seal. The strip of the third sealant/adhesive 28 has a higher viscosity than the strip of the fourth sealant/adhesive 30 prior to installation.

The strip of the second sealant/adhesive 26 is dimensioned to interact with the wires in the weld area of a terminal where the wires are mechanically and electrically attached to the terminal. The second sealant/adhesive 26 is positioned proximate to and interacts with the free ends of the wires to allow the second sealant/adhesive 26 to flow and properly seal the free ends of the wires.

Upon the application of heat (e.g., in an infrared oven for 30 seconds or other time period) after installation of the shrinkable tubing 22 over the electrical terminal, the second sealant/adhesive 26 melts and flows across and proximate to the free ends of the wires. The interaction of the second sealant/adhesive 26 with the wires in the weld area provides a robust seal at the free ends of the wires.

As the second sealant/adhesive 26 is a small controlled strip, the adhesive flow of the second sealant/adhesive 26 is controlled and constrained in an open geometry, such as at the free ends of the wires. In addition, the controlled flow allows the second sealant/adhesive 26 to encapsulate the sharp free ends of the individual wires. While in some instances a small amount of second sealant/adhesive 26 may travel onto the terminal attachment portion of the terminal, the amount will be insignificant with regard to the functioning of the electrical terminal.

In addition, the strip of the third sealant/adhesive 28 melts and flows across the wire attachment portion or surface of the plurality of wires to form the barrier, and the strip of the fourth sealant/adhesive 30 melts and flows across the plurality of wires filling any present air voids. The shrinkable tubing 22 shrinks to encapsulate the plurality of electrical wires and the wire attachment portion of the electrical terminal, thereby substantially sealing the melted sealant/adhesive 24, 26, 28. 30 within the shrinkable tubing 22. During the heating process, the strip of the first sealant/adhesive 24 and the third sealant/adhesive 28 effectively constrains the flow of the fourth sealant/adhesive 30 in the direction of the terminal attachment portion of the terminal, thereby reducing or preventing any problematic contamination of the terminal attachment portion.

The geometry of the first sealant/adhesive 24, the second sealant/adhesive 26, the third sealant/adhesive 28 and the fourth sealant/adhesive 30 allows for the controlled flow of the first sealant/adhesive 24, the second sealant/adhesive 26, the third sealant/adhesive 28 and the fourth sealant/adhesive 30. The configuration of the first sealant/adhesive 24, the second sealant/adhesive 26, the third sealant/adhesive 28 and the fourth sealant/adhesive 30 are meant to be illustrative. For example, the widths and lengths of the first sealant/adhesive 24, the second sealant/adhesive 26, the third sealant/adhesive 28 and the fourth sealant/adhesive 30 may vary.

In the illustrative embodiment shown in FIGS. 1 through 5, the first sealant/adhesive 24, the second sealant/adhesive 26, the third sealant/adhesive 28 and the fourth sealant/adhesive 30 have a generally planar configuration. However, other cross-section profiles and geometries may be used. The configuration of the first sealant/adhesive 24, the second sealant/adhesive 26, the third sealant/adhesive 28 and/or the fourth sealant/adhesive 30 can be altered to allow different amounts of the first sealant/adhesive 24, the second sealant/adhesive 26, the third sealant/adhesive 28 and/or the fourth sealant/adhesive 30 to flow to different regions along the width of the terminal.

While the present invention has been illustrated by the description of illustrative embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A sealing device for sealing an electrical terminal, comprising:
   a heat shrinkable tubing having an inner wall;
   a first sealant/adhesive configured to cooperate with the heat shrinkable tubing, the first sealant/adhesive having a first sealant/adhesive first surface and an oppositely facing first sealant/adhesive second surface, the second surface of the first sealant/adhesive being ultra-sonically bonded to the inner wall of the heat shrinkable tubing prior to placement of the sealing device over the electrical terminal, the first sealant/adhesive has a first viscosity;
   a second sealant/adhesive configured to cooperate with free ends of electrical conductors which are in electrical engagement with the electrical terminal, the second sealant/adhesive having a second sealant/adhesive first surface and an oppositely facing second sealant/adhesive second surface, the second sealant/adhesive first surface provided in engagement with the electrical conductors, the second sealant/adhesive second surface provided in engagement and bonded with the first sealant/adhesive first surface, the second sealant/adhesive having a second viscosity which has a lower viscosity than the first sealant/adhesive;
   the first sealant/adhesive having a melting point which is below the melting point of the second sealant/adhesive; and
   a third sealant/adhesive provided proximate the first sealant/adhesive the third sealant/adhesive configured to cooperate with the electrical conductors, the third sealant/adhesive having a third sealant/adhesive first surface and an oppositely facing third sealant/adhesive second surface, the third sealant/adhesive first surface provided in engagement with the electrical conductors, the third sealant/adhesive having a third viscosity which is higher than the first viscosity of the first sealant/adhesive which, upon application of heat, allows the third sealant/adhesive to melt and conform to a surface of the electrical conductors without significantly flowing from a designated region of the electrical conductors.

2. The sealing device as recited in claim 1, wherein the third sealant/adhesive second surface is provided in engagement and bonded with the first sealant/adhesive first surface.

3. The sealing device as recited in claim 2, wherein a fourth sealant/adhesive is provided proximate the third sealant/adhesive, the fourth sealant/adhesive is configured to cooperate with the electrical conductors, the fourth sealant/ adhesive having a fourth sealant/adhesive first surface and an oppositely facing fourth sealant/adhesive: second surface, the fourth sealant/adhesive first surface provided in engagement with the electrical conductors, the fourth sealant/adhesive having a fourth viscosity which, upon application of heat, allows the fourth sealant/adhesive to melt and flow across and between the free ends of the electrical conductors to fill air voids present between the electrical conductors.

4. The sealing device as recited in claim 3, wherein the fourth sealant/adhesive second surface provided in engagement and bonded with the first sealant/adhesive first surface.

5. The sealing device as recited in claim 4, wherein the fourth viscosity of the fourth sealant/adhesive is equal to the second viscosity of the second sealant/adhesive.

6. The sealing device as recited in claim 5, wherein the second sealant/adhesive, the third sealant/adhesive and the fourth sealant/adhesive form a planar member.

7. The sealing device as recited in claim 1, wherein the first sealant/adhesive has a thickness of between 0.25 mm and 1.0 mm.

8. The sealing device as recited in claim 1, wherein the first sealant/adhesive has an equal or greater width than the second sealant/adhesive.

9. The sealing device as recited in claim 1, wherein the first viscosity of the first sealant/adhesive is greater than 20 Pa·s at an installation temperature.

10. The sealing device as recited in claim 1, wherein the second viscosity of the second sealant/adhesive is less than 20 Pa·s at an installation temperature.

11. The sealing device as recited in claim 1, wherein the first sealant/adhesive is a cross-linkable sealant/adhesive.

12. A sealing device for use with a cover for sealing electrical conductors of an electrical terminal, the cover having an inner wall, the sealing device comprising:
a first sealant/adhesive configured to cooperate with the cover, the first sealant/adhesive having a first sealant/adhesive first surface and an oppositely facing first sealant/adhesive second surface, the second surface of the first sealant/adhesive bonded to the inner wall of the cover, the first sealant/adhesive has a first viscosity;
a second sealant/adhesive configured to cooperate with free ends of the electrical conductors which are in electrical engagement with the electrical terminal, the second sealant/adhesive having a second sealant/adhesive first surface and an oppositely facing second sealant/adhesive second surface, the second sealant/adhesive first surface provided in engagement with the electrical conductors, the second sealant/adhesive second surface provided in engagement and bonded with the first sealant/adhesive first surface, the second sealant/adhesive having a second viscosity which has a lower viscosity than the first sealant/adhesive;
a third sealant/adhesive configured to cooperate with the electrical conductors, the third sealant/adhesive having a third sealant/adhesive first surface and an oppositely facing third sealant/adhesive second surface, the third sealant/adhesive first surface provided in engagement with the electrical conductors, the third sealant/adhesive second surface provided in engagement and bonded with the first sealant/adhesive first surface, the third sealant/adhesive having a third viscosity which has a higher than the second sealant/adhesive;
a fourth sealant/adhesive configured to cooperate with the electrical conductors, the fourth sealant/adhesive having a fourth sealant/adhesive, first surface and an oppositely facing fourth sealant/adhesive second surface, the fourth sealant/adhesive first surface provided in engagement with the electrical conductors, the fourth sealant/adhesive second surface provided in engagement and bonded with the first sealant/adhesive first surface, the fourth sealant/adhesive having a fourth viscosity which has a lower viscosity than the first sealant/adhesive.

13. The sealing device as recited in claim 12, wherein the third sealant/adhesive is provided proximate the first sealant/adhesive, upon application of heat, the third sealant/adhesive melts and conform to a surface of the electrical conductors without significantly flowing from a designated region of the electrical conductors.

* * * * *